US008027063B2

(12) United States Patent
Maebashi

(10) Patent No.: US 8,027,063 B2
(45) Date of Patent: Sep. 27, 2011

(54) IMAGE FORMING APPARATUS

(75) Inventor: Yoichiro Maebashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 11/692,314

(22) Filed: Mar. 28, 2007

(65) Prior Publication Data

US 2007/0237531 A1 Oct. 11, 2007

(30) Foreign Application Priority Data

Apr. 7, 2006 (JP) ................................ 2006-106326

(51) Int. Cl.
*H04N 1/40* (2006.01)
*H04N 1/407* (2006.01)
*H04N 1/409* (2006.01)

(52) U.S. Cl. ....... 358/3.26; 358/3.24; 358/504; 358/525

(58) Field of Classification Search .................. 358/1.9, 358/2.99, 3.06, 3.21, 3.24, 3.26, 504, 525; 347/15, 232
See application file for complete search history.

(56) References Cited

U.S. PATENT DOCUMENTS 6,350,004 B1 * 2/2002 Askren .......................... 347/14
6,547,355 B1 * 4/2003 Shimada et al. ................ 347/12
6,968,076 B1 * 11/2005 OuYang et al. ............... 382/112

FOREIGN PATENT DOCUMENTS

JP 2002-116394 A 4/2002
JP 2003-241131 A 8/2003
JP 2004-170755 A 6/2004

* cited by examiner

*Primary Examiner* — James A Thompson
(74) *Attorney, Agent, or Firm* — Canon USA, Inc. IP Division

(57) ABSTRACT

An image forming apparatus includes a coordinate converter that corrects an image position in one pixel unit by converting a coordinate, a gradation value converter that corrects the image position in less-than-one pixel unit by converting a gradation value, an image outputting unit that forms a detection toner image including an intermediate gradation pixel onto an image bearing member that can bear a toner image, and a light reflection characteristic detector that detects a light reflection characteristic of the detection toner image. The gradation value converter is adjusted in accordance with a detection output of the light reflection characteristic detector.

8 Claims, 16 Drawing Sheets

FIG. 6A

| | | | | | |
|---|---|---|---|---|---|
| 1.0 | 1.0 | 1.0 | 1.0 | 1.0 | 1.0 |
| 0 | 0 | 0 | 0 | 0 | 0 |
| 0 | 0 | 0 | 0 | 0 | 0 |
| 1.0 | 1.0 | 1.0 | 1.0 | 1.0 | 1.0 |
| 0 | 0 | 0 | 0 | 0 | 0 |
| 0 | 0 | 0 | 0 | 0 | 0 |

FIG. 6B

| | | | | | |
|---|---|---|---|---|---|
| $0.5\times\gamma$ | $0.5\times\gamma$ | $0.5\times\gamma$ | $0.5\times\gamma$ | $0.5\times\gamma$ | $0.5\times\gamma$ |
| $0.5\times\gamma$ | $0.5\times\gamma$ | $0.5\times\gamma$ | $0.5\times\gamma$ | $0.5\times\gamma$ | $0.5\times\gamma$ |
| 0 | 0 | 0 | 0 | 0 | 0 |
| $0.5\times\gamma$ | $0.5\times\gamma$ | $0.5\times\gamma$ | $0.5\times\gamma$ | $0.5\times\gamma$ | $0.5\times\gamma$ |
| $0.5\times\gamma$ | $0.5\times\gamma$ | $0.5\times\gamma$ | $0.5\times\gamma$ | $0.5\times\gamma$ | $0.5\times\gamma$ |
| 0 | 0 | 0 | 0 | 0 | 0 |

FIG. 8A
INCLINATION DISPLACEMENT AMOUNT
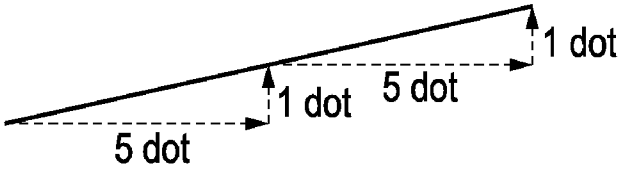
FIG. 8B
BIT MAP IMAGE (BEFORE GRADATION CORRECTION)
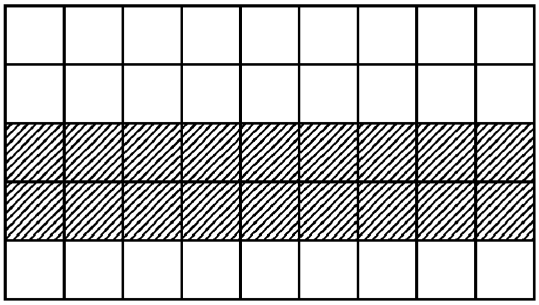
FIG. 8C
CORRECTED BIT MAP IMAGE
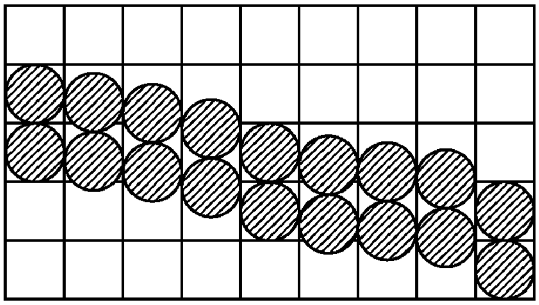
FIG. 8D
IMAGE DATA CORRECTION PARAMETERS
| | | | | | | | | | |
|---|---|---|---|---|---|---|---|---|---|
| $\Delta y$ | 0 | 0.25 | 0.5 | 0.75 | 1 | 1.25 | 1.5 | 1.75 | 2 |
| k | 0 | 0 | 0 | 0 | 1 | 1 | 1 | 1 | 2 |
| $\beta = \Delta y - k$ | 0 | 0.25 | 0.5 | 0.75 | 0 | 0.25 | 0.5 | 0.75 | 0 |
| $\alpha = 1 - \beta$ | 1 | 0.75 | 0.5 | 0.25 | 1 | 0.75 | 0.5 | 0.25 | 1 |

FIG. 8E
CORRECTED VALUES AFTER CONVERSION OF GRADATION VALUES (WHEN G=1.5)
| | | | | | | | | | |
|---|---|---|---|---|---|---|---|---|---|
| Δy | 0 | 0.25 | 0.5 | 0.75 | 1 | 1.25 | 1.5 | 1.75 | 2 |
| k | 0 | 0 | 0 | 0 | 1 | 1 | 1 | 1 | 2 |
| β' | 0 | 0.338 | 0.675 | 0.838 | 0 | 0.338 | 0.675 | 0.838 | 0 |
| α' | 1 | 0.838 | 0.675 | 0.338 | 1 | 0.838 | 0.675 | 0.338 | 1 |
FIG. 8F
BIT MAP IMAGE (AFTER GRADATION CORRECTION)
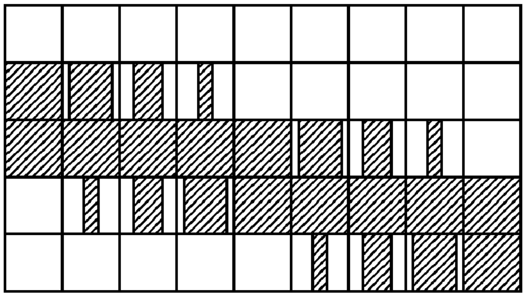
FIG. 8G
EXPOSURE IMAGE
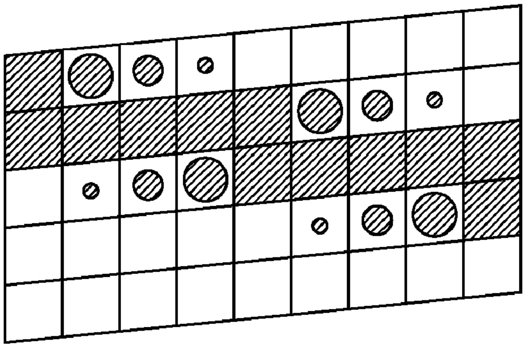

IMAGE FORMING APPARATUS

BACKGROUND OF THE INVENTION

1. Field of the Invention

The present invention relates to an electrophotographic image forming apparatus such as a printer or a color copying machine.

2. Description of the Related Art

In recent years, an increase in image formation speed of electrophographic color image forming apparatuses has increased the types of tandem color image forming apparatuses. A tandem color image forming apparatus includes a photosensitive drum and developing devices, and successively transfers images of different colors onto a recording medium or an image conveying belt. The number of developing devices is the same as the number of coloring materials. The tandem color image forming apparatus is known to have a plurality of factors that cause misregistration. Accordingly, various methods are proposed to deal with these factors.

One factor involves ununiformity and mounting displacement of a lens in a deflection scanner and displacement of the deflection scanner when it is mounted to the body of the color image forming apparatus. In this case, a scanning line is inclined and bent. The inclination and bending depend upon color, thereby resulting in misregistration.

Japanese Patent Laid-Open No. 2002-116394 discusses a method of overcoming misregistration. In the method, in the step of assembling a deflection scanner, the bending amount of a scanning line is measured with an optical sensor, a lens is mechanically rotated to adjust the bending of the scanning line, and then the deflection scanner is secured to an image forming apparatus body with an adhesive.

Japanese Patent Laid-Open No. 2003-241131 discusses another method. In the method, in the step of mounting a deflection scanner to a color image forming apparatus body, the inclination of a scanning line is measured with an optical sensor, the deflection scanner is mechanically inclined to adjust the inclination of the scanning line, and then the deflection scanner is mounted to the color image forming apparatus body.

Japanese Patent Laid-Open No. 2004-170755 discusses still another method. In the method, the inclination and bending amount of a scanning line are measured with an optical sensor, and bitmap image data is corrected so as to cancel the inclination and the bending to form an image based on the corrected data. Since this method allows misregistration to be electrically corrected as a result of processing the image data, it does not require a mechanical adjuster or an adjusting step during the assembly. From these two points, this method allows misregistration to be corrected at a lower cost compared to the methods discussed in Japanese Patent Laid-Open No. 2003-241131 and 2003-241131. There are two methods of electrically correcting misregistration. One method is performed in one pixel unit and the other method is performed in less-than-one pixel unit. In the correction in one pixel unit, pixels are shifted in a subscanning direction in one pixel unit in accordance with the amounts by which the inclination and bending are corrected. In the correction in less-than-one pixel unit, gradation values of bit image data are adjusted for front and back pixels in the subscanning direction. By this correction, it is possible to eliminate an unnatural step at a shifted boundary resulting from the correction in one pixel unit, so that an image can be smoothed.

However, correcting misregistration by the method that is discussed in Japanese Patent Laid-Open No. 2004-170755 may cause a density variation in a fine image. The density variation of a fine image will be described with reference to FIG. 14. An input image 601 is a thin line of one dot. When an image 602 produced by performing color misregistration correction on the input image 601 is actually formed, an output image resulting from the correction of the color misregistration becomes a thin-line image having an ununiform density even though the input image 601 is a thin-line image having a constant density. This is caused by the electrophotographic image forming apparatus not being generally good at forming an isolated pixel with an image gradation value and an actual image density value remaining proportional to each other. Accordingly, this weakness causes noticeable density variation to occur in the fine image formed by a thin line.

SUMMARY OF THE INVENTION

The present invention makes it possible to overcome density variation in a fine image occurring when misregistration is electrically corrected.

According to the present invention, there is provided an image-forming apparatus configured to adjust the slope of an image, which slope is defined in terms of at least one gradation value. The image-forming apparatus comprises a first converter that corrects at least one image slope in less-than-one pixel units by calculating the gradation value, an image-forming device that forms at least one toner image onto an image bearing member on the basis of image formation corrected by the converter, a controller configured to form a test toner image including an intermediate gradation pixel using the image-forming device, a detector that detects a light reflection characteristic of the test toner image that is formed by the image-forming device, and an adjuster that adjusts the converter in accordance with an output of the detector.

The present invention provides a method of preventing density variation in a fine image, resulting from electrically correcting an image position, by (1) adjusting gradation value conversion parameters, used for correcting misregistration, according to a detection result of an optical sensor that detects the density of a detection toner image (including an intermediate gradation pixel) that is formed on an image bearing member, or (2) adjusting gradation value conversion parameters, used for correcting misregistration, according to a result of evaluation conducted by a user visually evaluating a test pattern of a test pattern image (including an intermediate gradation pixel) that is formed on a transfer material, or (3) by adjusting a gradation value converter on the basis of test pattern image information read by an original reader as a result of forming a test pattern image (including an intermediate gradation pixel) on a transfer material by an image forming device.

Further features, structures, and advantages of the present invention will become apparent from the following detailed description and the attached drawings.

BRIEF DESCRIPTION OF THE DRAWINGS

FIGS. 6A and 6B illustrate toner patch patterns according to the first embodiment.

FIGS. 8A to 8G show in detail a method of correcting misregistration.

DESCRIPTION OF THE EMBODIMENTS

First Embodiment

This embodiment is related to a method of preventing density variation in a fine image, resulting from electrically correcting misregistration, by adjusting gradation value conversion parameters, used for correcting the misregistration, according to a detection result of an optical sensor that detects the density of a detection toner image (including an intermediate gradation pixel) that is formed on an image bearing member.

Figure 15:
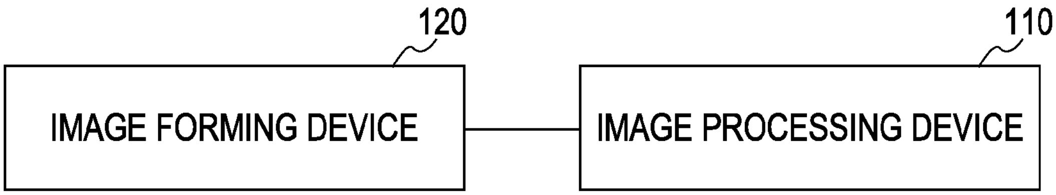
FIG. 15 illustrates a basic structure of a color image forming apparatus.

FIG. 15 illustrates a basic structure of a color image forming apparatus that is used in the first embodiment. The color image forming apparatus includes an image-forming device 120 and an image-processing device 110, such as a printer controller.

Figure 16:
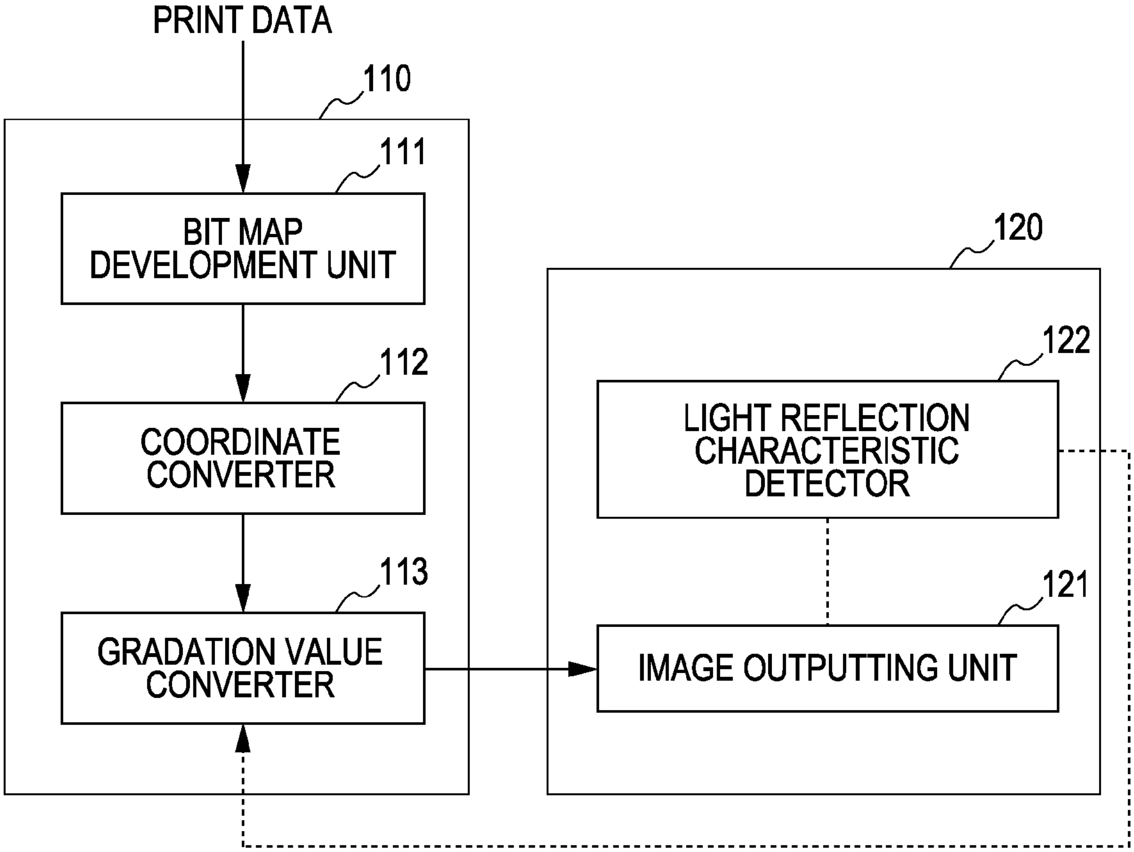
FIG. 16 illustrates a basic structure for correcting registration.

FIG. 16 illustrates a basic structure for correcting registration.

In FIG. 16, reference numeral 111 denotes a bitmap development unit that develops print data in accordance with a bitmap. Reference numeral 112 denotes a coordinate converter that corrects a position of an image in a subscanning direction in one pixel units. Reference numeral 113 denotes a gradation value converter that corrects in less-than-one pixel units the position of the image in the subscanning direction. The bitmap development unit 111, the coordinate converter 112, and the gradation value converter 113 are formed in the image-processing device 110. Reference numeral 121 denotes an image-outputting unit that performs operations for forming an image, such as a developing operation, a transfer operation, and a fixing operation. Reference numeral 122 denotes a light-reflection-characteristic detector including a density sensor and a density-converting processing unit that are described later. The image-outputting unit 121 and the light-reflection-characteristic detector 122 are formed in the image-forming device 120. A detection result of the light-reflection-characteristic detector 122 is used to adjust the gradation-value converter 113.

The foregoing structure corresponds to the basic structure for correcting registration. The details of correcting registration will be described later.

Figure 1:
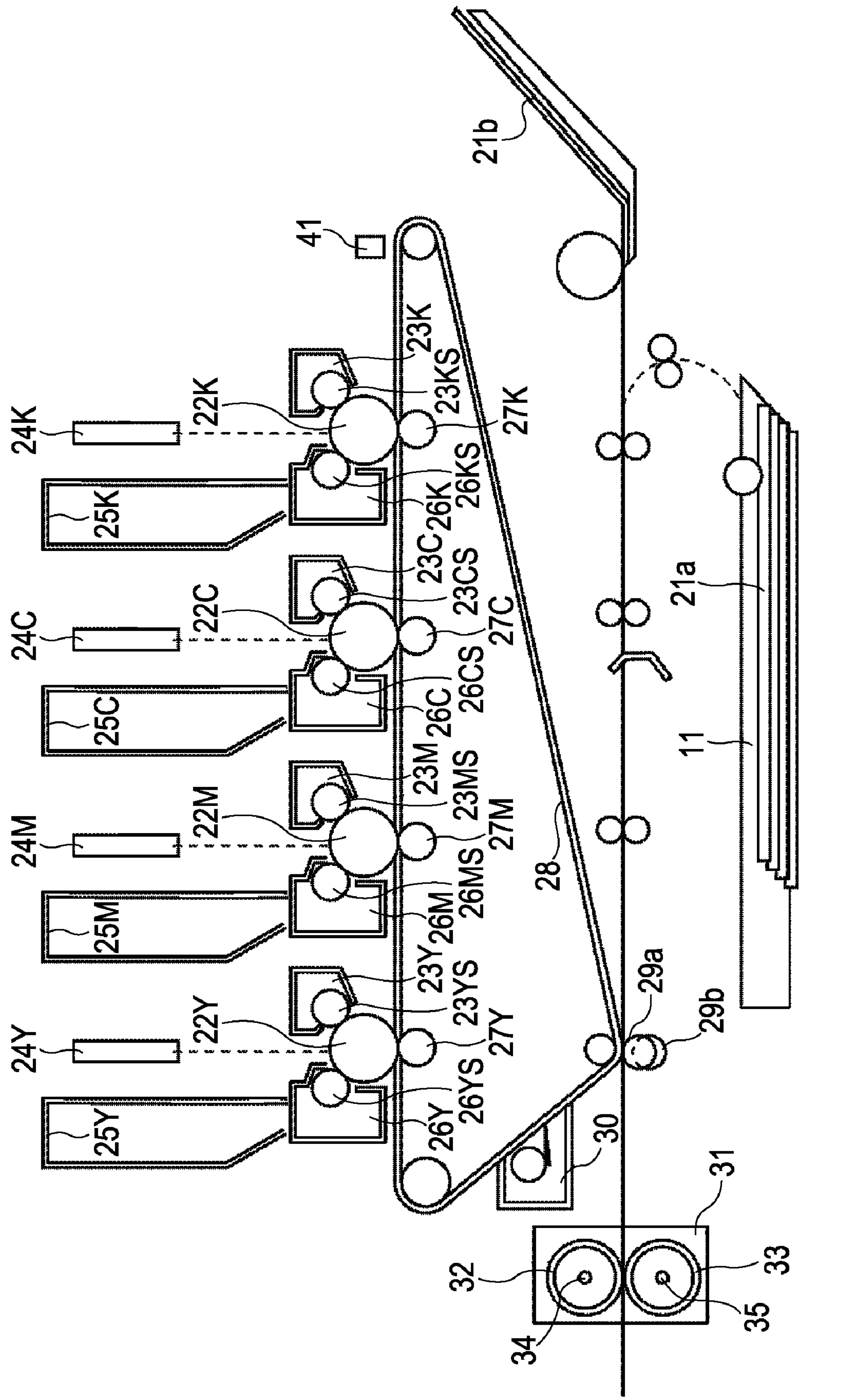
FIG. 1 is a sectional view of an image forming apparatus according to a first embodiment of the present invention.

FIG. 1 is a sectional view of an image-forming device of a color-image-forming apparatus according to the first embodiment. The color-image-forming apparatus includes an image-forming device (shown in FIG. 1) and an image-processing device (not shown). The image-processing device generates bitmap-image information and the image-forming device (shown in FIG. 1) forms an image onto a recording medium on the basis of the generated image information.

The image-forming apparatus according to the embodiment is an electrophotographic color-image-forming apparatus and a tandem color-image-forming apparatus that uses an intermediate transfer member 28. The operations of the image-forming device will hereunder be described.

The image-forming device drives exposure light in accordance with an exposure time in which the image-processing device performs a processing operation, forms electrostatic latent images, forms monochromatic toner images by developing the electrostatic latent images, forms a multi-colored toner image by superimposing the monochromatic toner images, transfers the multi-colored toner image onto a recording medium 11, and fixes the multi-colored toner image to the recording medium 11.

A charger includes four filling charging portions 23Y, 23M, 23C, and 23K for charging photosensitive members 22Y, 22M, 22C, and 22K in accordance with a yellow (Y) station, a magenta (M) station, a cyan (C) station, and a black (K) station. The filling charging portions 23Y, 23M, 23C, and 23K are provided with respective sleeves 23YS, 23MS, 23CS, and 23KS.

The photosensitive members 22Y, 22M, 22C, and 22K are formed by applying organic photoconductive layers to peripheries of aluminum cylinders, and are rotated by transmitting driving power of driving motors (not shown) thereto. The driving motors rotate the photosensitive members 22Y, 22M, 22C, and 22K counterclockwise in accordance with the image-forming operations.

An exposure unit irradiates the photosensitive members 22Y, 22M, 22C, and 22K with exposure light by scanners 24Y, 24M, 24C, and 24K, and selectively performs the exposure on the surfaces of the photosensitive members 22Y, 22M, 22C, and 22K to form electrostatic latent images.

A developer includes four developing portions 26Y, 26M, 26C, and 26K for developing the images in accordance with the yellow (Y) station, the magenta (M) station, the cyan (C) station, and the black (K) station to make visible the electrostatic latent images. The developing portions 26Y, 26M, 26C, and 26K are provided with respective sleeves 26YS, 26MS, 26CS, and 26KS, and are removable.

At a transfer unit, monochromatic toner images are transferred onto the intermediate transfer member 28 from the photosensitive members 22Y, 22M, 22C, and 22K as a result of rotating the intermediate transfer member 28 clockwise, rotating the photosensitive members 22Y, 22M, 22C, and 22K, and rotating primary transfer rollers 27Y, 27M, 27C, and 27K opposing the photosensitive members 22Y, 22M, 22C, and 22K. By applying primary transfer voltage to the primary transfer rollers 27Y, 27M, 27C, and 27K and by making the rotational speed of the photosensitive members 22Y, 22M, 22C, and 22K different from the rotational speed of the intermediate transfer member 28, the monochromatic toner images are efficiently transferred onto the intermediate transfer member 28.

In addition, at the transfer unit, the monochromatic toner images are superimposed upon the intermediate transfer member 28 according to the stations, and a multi-colored toner image, formed by superimposing the monochromatic toner images, is transported to secondary transfer rollers 29 by the rotation of the intermediate transfer member 28. Then, a recording medium 11 is nipped and conveyed to the secondary transfer rollers 29 from a sheet-feed tray 21, so that the multi-colored toner image on the intermediate transfer member 28 is transferred onto the recording medium 11. Secondary transfer voltage is applied to the secondary transfer rollers 29 to electrostatically transfer the toner image. This is called "secondary transfer." While the multi-colored toner image is being transferred onto the recording medium 11, the secondary transfer roller 29 comes into contact with the recording medium 11 at a position 29*a* and separates from the recording medium 11 at a position 29*b* after printing.

A fixing unit includes a fixing roller 32 and a pressure roller 33 for fusing and fixing the multi-colored toner image transferred onto the recording medium 11 to the recording medium 11. The fixing roller 32 heats the recording medium 11. The pressure roller 33 brings the recording medium 11 into press-contact with the fixing roller 32. The fixing roller 32 and the pressure roller 33 are hollow rollers, and include a heater 34 and a heater 35, respectively, in their interior portions. A fixing portion 31 conveys the recording medium 11 holding the multi-colored toner image by the fixing roller 32 and the pressure roller 33, and applies heat and pressure to the recording medium 11 to fix the toner to the recording medium 11.

The recording medium 11 after the fixing of the toner is then discharged onto a sheet-discharge tray (not shown) by sheet-discharge rollers (not shown), and the image-forming operations are completed.

A cleaner 30 cleans off residual toner on the intermediate transfer member 28. Waste toner remaining after transferring onto the recording medium 11 the toner image that is of four colors and that is formed on the intermediate transfer member 28 is accumulated in a cleaner container.

A density sensor 41 is disposed so as to oppose the intermediate transfer member 28, and detects the density of a detection toner patch 64 (see FIG. 2) formed on the intermediate transfer member 28.

Figure 2:
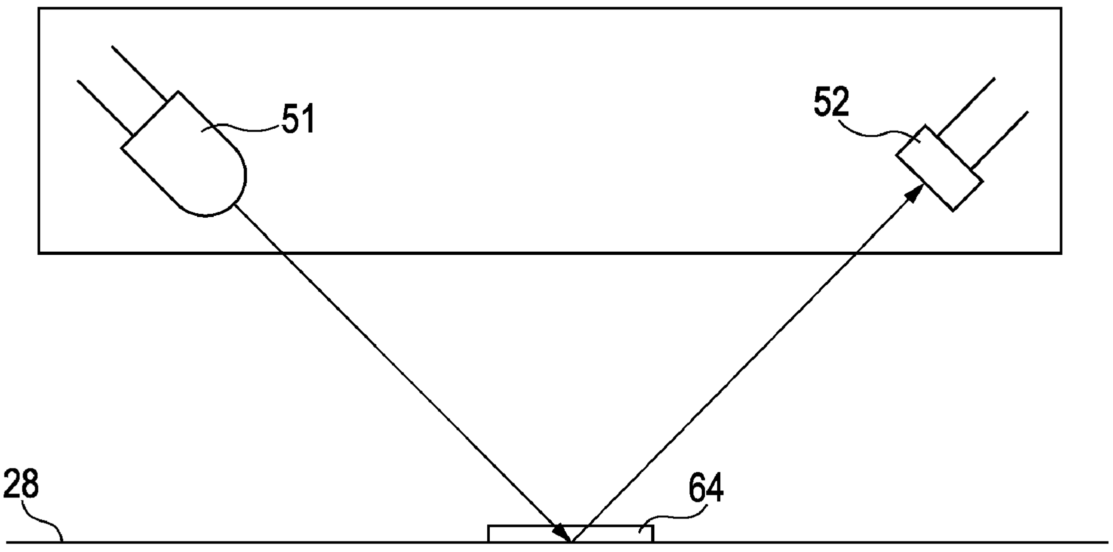
FIG. 2 shows a structure of a density sensor according to the first embodiment.

FIG. 2 shows a structure of the density sensor 41. The density sensor 41 includes an infrared-light emitting element 51, such as a light-emitting diode (LED), a light-receiving element 52, such as a photodiode, an integrated circuit (IC) (not shown) etc. used to process light-reception data, and a holder (not shown) that accommodates them. The light-receiving element 52 detects the intensity of reflected light from the toner patch 64. Although the density sensor 41 according to the embodiment is formed so as to detect specular reflected light, the method of detecting density is not limited thereto. For example, the density sensor 41 may be formed so as to detect diffused reflected light. An optical element (not shown), such as a lens, may be used to couple the light-emitting element 51 and the light-receiving element 52.

In the embodiment, the intermediate transfer member 28 is a single-layer resin belt formed of polyimide and having a peripheral length of 880 mm. For adjusting the resistance of the belt, a proper number of fine carbon particles are dispersed in the resin. The surface of the intermediate transfer member 28 is black, is smooth, and has high glossiness that is approximately 100% (when measured with a gloss meter IG-320 manufactured by Horiba, Ltd.).

Figure 3:
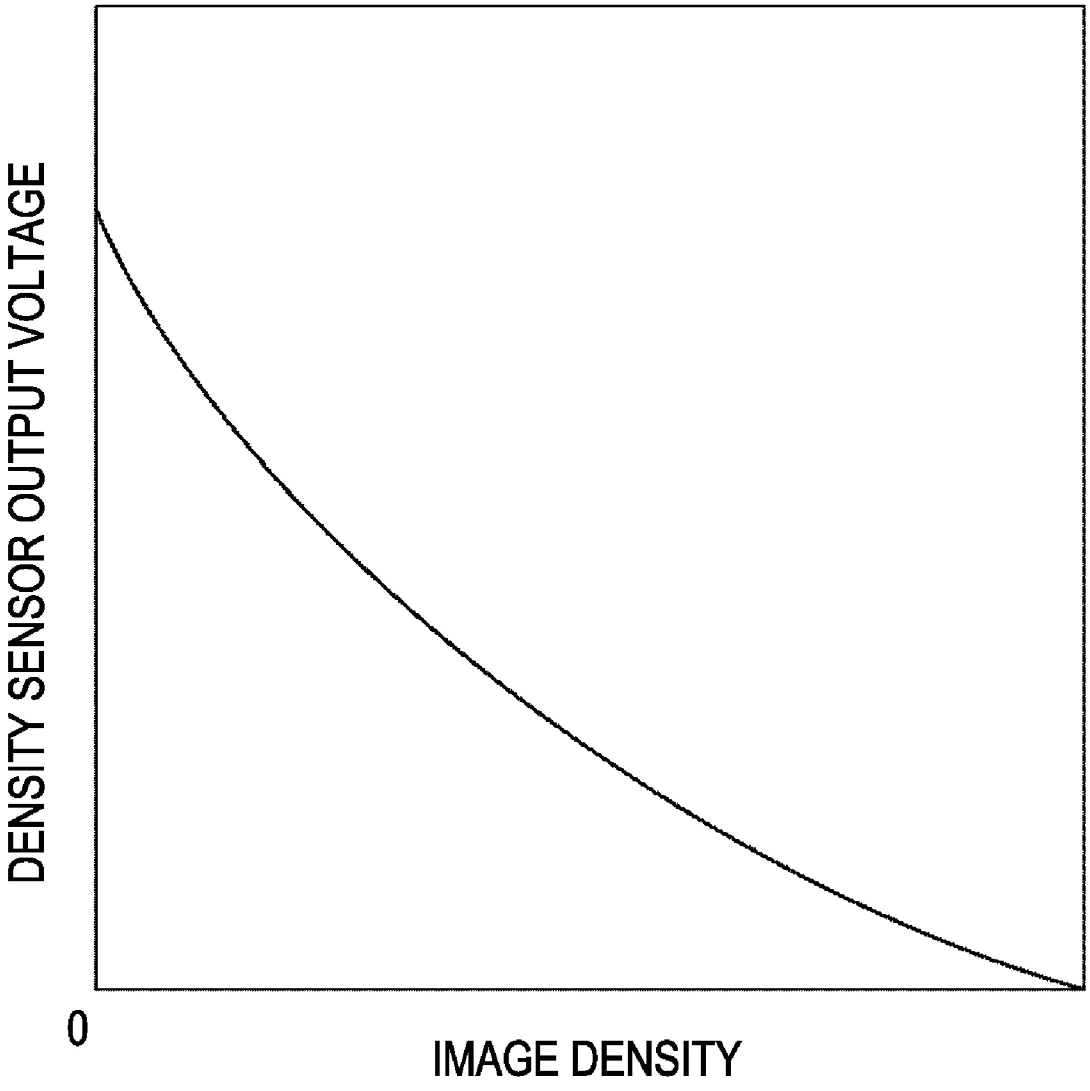
FIG. 3 is a graph of a characteristic of the density sensor according to the first embodiment.

When the surface of the intermediate transfer member 28 is exposed (toner amount is 0), the light-receiving element 52 of the density sensor 41 detects reflected light. This is because, as mentioned above, the surface of the intermediate transfer member 28 is glossy. When a toner image is formed on the intermediate transfer member 28, specular reflection output is gradually reduced in accordance with an increase in the density (toner amount) of the toner patch. This is because, when the surface of the intermediate transfer member 28 is covered with the toner, specular reflected light from the surface of the belt is reduced. FIG. 3 is a graph showing a relationship between toner amount and detection value of the density sensor. In FIG. 3, the vertical axis represents output voltage of the density sensor, and the horizontal axis represents image density (corresponding to toner amount). In accordance with the relationship illustrated in FIG. 3, the output voltage value of the density sensor is converted into a density value to detect the density of the toner patch.

Figure 4:
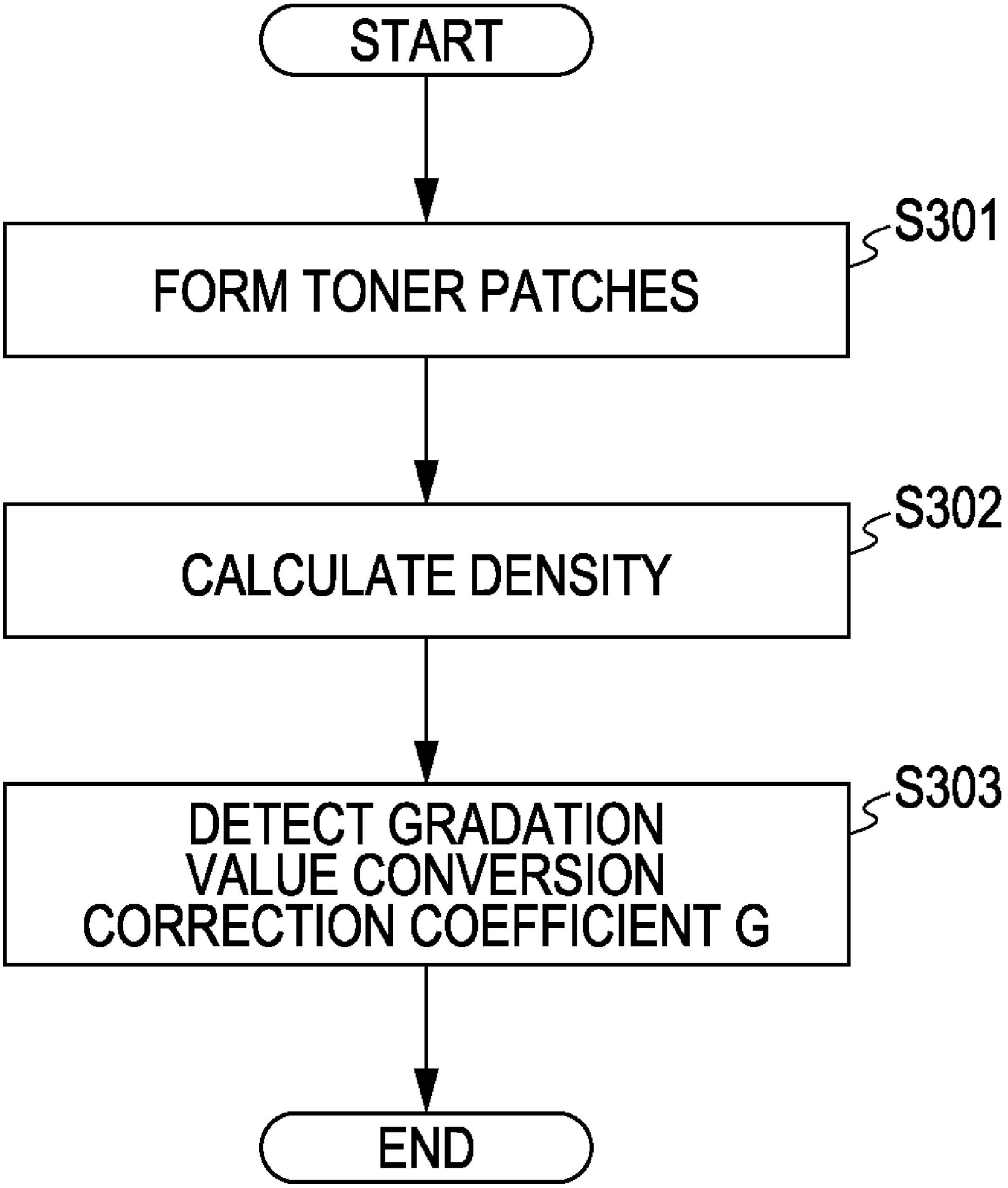
FIG. 4 is a flowchart of a procedure for calculating a gradation value conversion correction coefficient according to the first embodiment.

Next, a method of correcting a gradation-value conversion value (used for correcting misregistration) will be described with reference to the flowchart shown in FIG. 4.

Figure 5:
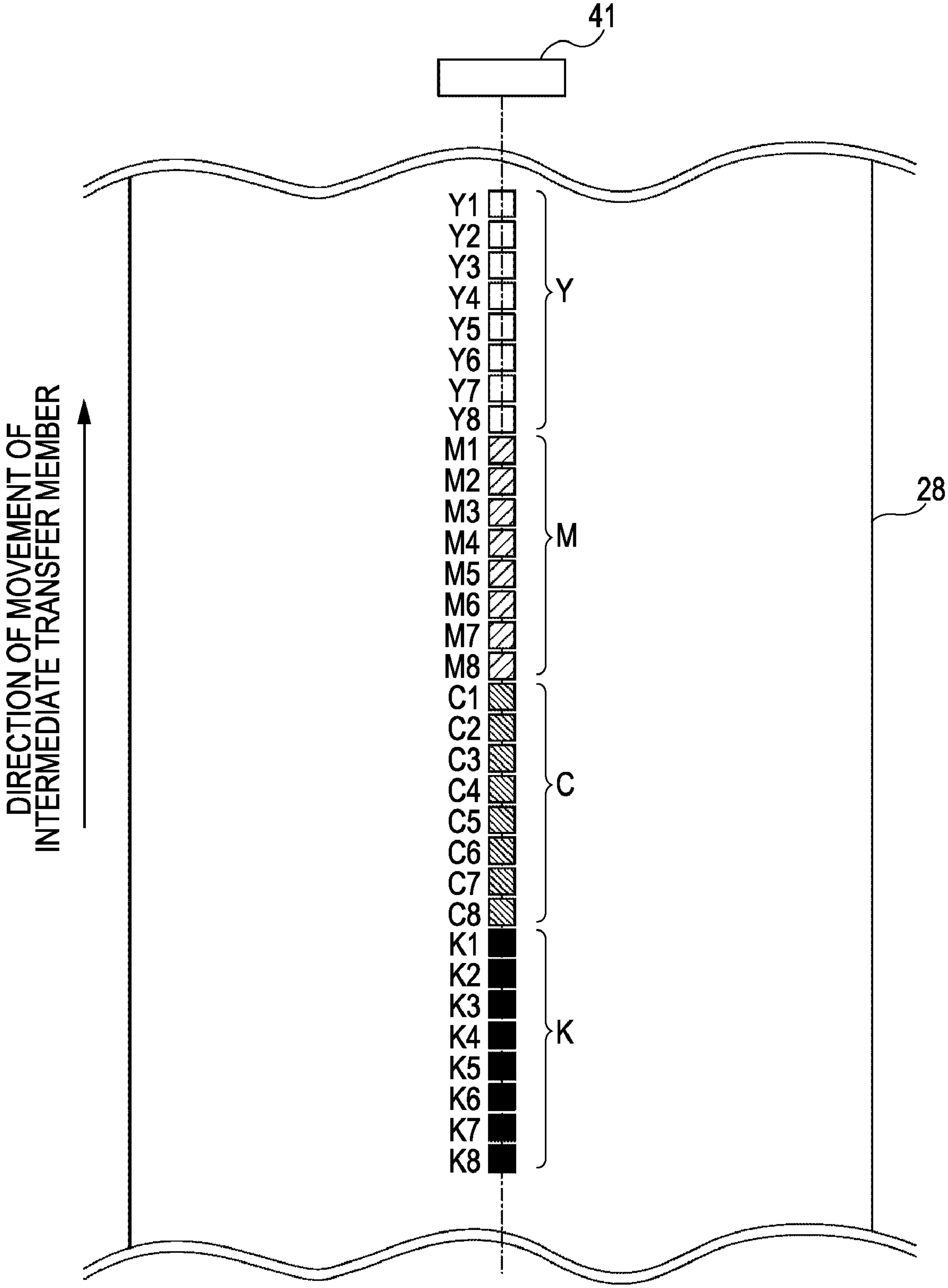
FIG. 5 shows an arrangement of toner patches according to the first embodiment.

First, in Step S301, toner patches are formed as detection toner images on the intermediate transfer member. FIG. 5 shows the toner patches formed on the intermediate transfer member. A total of 32 patches, each being a square patch having a side length of 8 mm, are formed at a 2-mm interval in correspondence with the location of the density sensor 41 and in accordance with Y, M, C, and K. Eight types of Y, M, C, and K are provided. The formation of these toner images is controlled by a controller. Each patch pattern will be described with reference to FIGS. 6A and 6B. Y1, M1, C1, and K1 are each a repeating pattern of one-dot horizontal lines (formed at intervals of 2 dots), and dot image data (exposure amount) of the lines is 100% (refer to FIG. 6A). Subsequently, a 100% full-exposure dot is represented as 1, and an intermediate gradation dot, having an exposure amount of from 0% to less than 100%, is represented by a number in a range of from 0 to less than 1.

Y2 to Y7, M2 to M7, C2 to C7, and K2 to K7 are each a pattern like that shown in FIG. 6B. One line is formed by two intermediate gradation dots. Compared to the pattern (the patterns Y1, M1, C1, and K1) shown in FIG. 6A, a center coordinate of a line is moved 0.5 dots downwards. The exposure amount of each intermediate gradation dot is $0.5\times\gamma$. For example, if $\gamma=1$, then one line is formed by adding two dots having an exposure amount of 0.5, so that the line has an exposure amount that is equal to the exposure amount of the patterns (Y1, M1, C1, and K1) shown in FIG. 6A. The value of $\gamma$ for Y2, M2, C2, and K2 is 0.9. The value of $\gamma$ for Y3, M3, C3, and K3 is 1.0. The value of $\gamma$ for Y4, M4, C4, and K4 is 1.1. The value of $\gamma$ for Y5, M5, C5, and K5 is 1.2. The value of $\gamma$ for Y6, M6, C6, and K6 is 1.3. The value of $\gamma$ for Y7, M7, C7, and K7 is 1.4. The value of $\gamma$ for Y8, M8, C8, and K8 is 1.5.

Next, in Step S302, the density of each toner patch is detected by the density sensor 41. The density is calculated as described above.

Next, in Step S303, a gradation-value conversion correction coefficient G is calculated.

The gradation-value conversion correction coefficient G is calculated by calculating the $\gamma$ value of an intermediate gradation line that causes its line density to become equal to that of one full-exposure dot line.

Figure 7:
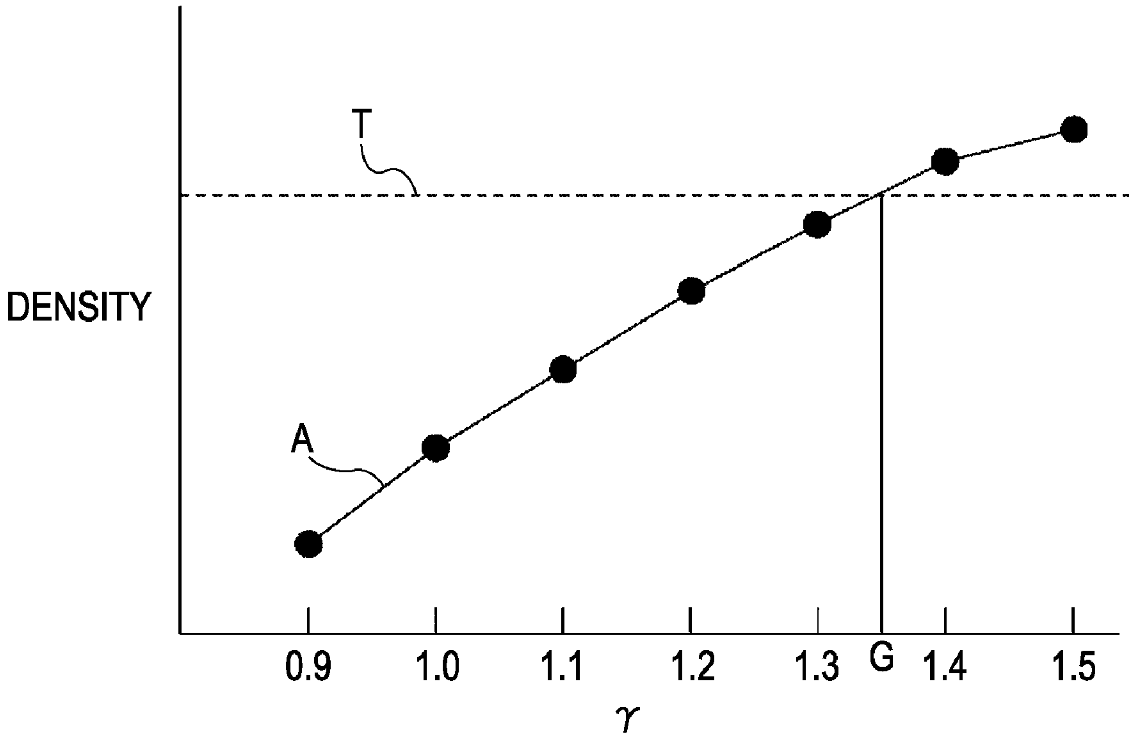
FIG. 7 illustrates correction of misregistration according to the first embodiment.

FIG. 7 illustrates the method of calculating the gradation-value conversion correction coefficient G. In FIG. 7, the horizontal axis represents $\gamma$ value and the vertical axis represents patch density calculated by the density sensor. In addition, a solid line A represents the density of an intermediate gradation dot line pattern, and a dotted line T represents the density of a full-exposure line pattern. The value $\gamma$ where the solid line A and the dotted line T intersect each other is equal to 1.35, so that the gradation-value conversion correction coefficient G is calculated as having a value of 1.35. That is, the density of a line formed by two dots as a result of light exposure of $0.5\times1.35=0.675$ is equal to the density of a full-exposure line pattern. The calculation of the gradation-value conversion correction coefficient G is performed in accordance with each color. The gradation value-conversion correction coefficient G is used in a method of electrically correcting misregistration described below.

Accordingly, the gradation-value conversion correction coefficient G, used for correcting misregistration, is calculated as described above.

The method of correcting misregistration according to the embodiment will be described in detail with reference to FIGS. 8A to 8G. First, in an apparatus manufacturing process, misregistration amounts are previously measured for image-forming apparatuses, so that misregistration correction amounts Δy for canceling the misregistration amounts are previously determined. The method of obtaining the misregistration correction amounts Δy is not limited to this method. For example, they may be obtained from a detection result of a registration-detection pattern, formed on, for example, the intermediate transfer member. Here, the detection result is provided by a registration-detecting sensor. Alternatively, they may be calculated from electronic information obtained by converting an image into the electronic data (by, for example, a commercially-available image scanner) as a result of outputting a misregistration measurement chart by the image forming apparatus.

FIG. 8A is an image of a scanning line having an inclination that rises upward and rightward. In the embodiment, an inclination of one dot is produced for every 5 dots in a main scanning direction of the exposure unit. FIG. 8B shows an example of a horizontal-straight-line bitmap image before converting a gradation value, and a two-dot line. FIG. 8C shows a corrected image of FIG. 8B for canceling the misregistration caused by the inclination of the scanning line shown in FIG. 8A. For achieving the corrected image shown in FIG. 8C, image data adjustment is performed on front and back pixels in the sub-scanning direction. FIG. 8D is a table showing a relationship between the misregistration correction amount Δy and gradation-value conversion parameters. k stands for a first digit of the misregistration correction amount Δy (decimal fractions are omitted). The first digit represents the subscanning-direction correction amount in one pixel unit. In the correction in one pixel unit, a first converter shifts pixels in the subscanning direction in one pixel unit in accordance with the correction amount.

α and β stand for image-data adjustment distribution coefficients for correction in the subscanning direction in less-than-one pixel unit. From information regarding the value of the misregistration correction amounts Δy after the decimal point, distribution coefficients of pixel gradation values for front and back pixels in the sub-scanning direction are expressed, and calculated as follows:

$$\beta = \Delta y - k$$

$$\alpha = 1 - \beta$$

where α represents the distribution coefficient of the leading pixel and β represents the distribution coefficient of the succeeding pixel.

Next, the image distribution coefficients will be corrected using the gradation value conversion correction coefficient G calculated as mentioned above. The image distribution coefficients are corrected by the following expressions. Image distribution coefficients after the correction are α' and β'. When $0 \leqq \alpha \leqq 0.5$, then $\alpha' = G \times \alpha$. When $0.5 < \alpha \leqq 1.0$, then $\alpha' = (2-G) \times \alpha + G - 1$. When $0 \leqq \beta \leqq 0.5$, then $\beta' = G \times \beta$. When $0.5 < \beta \leqq 1.0$, then $\beta' = (2-G) \times \beta + G - 1$.

Figure 9:
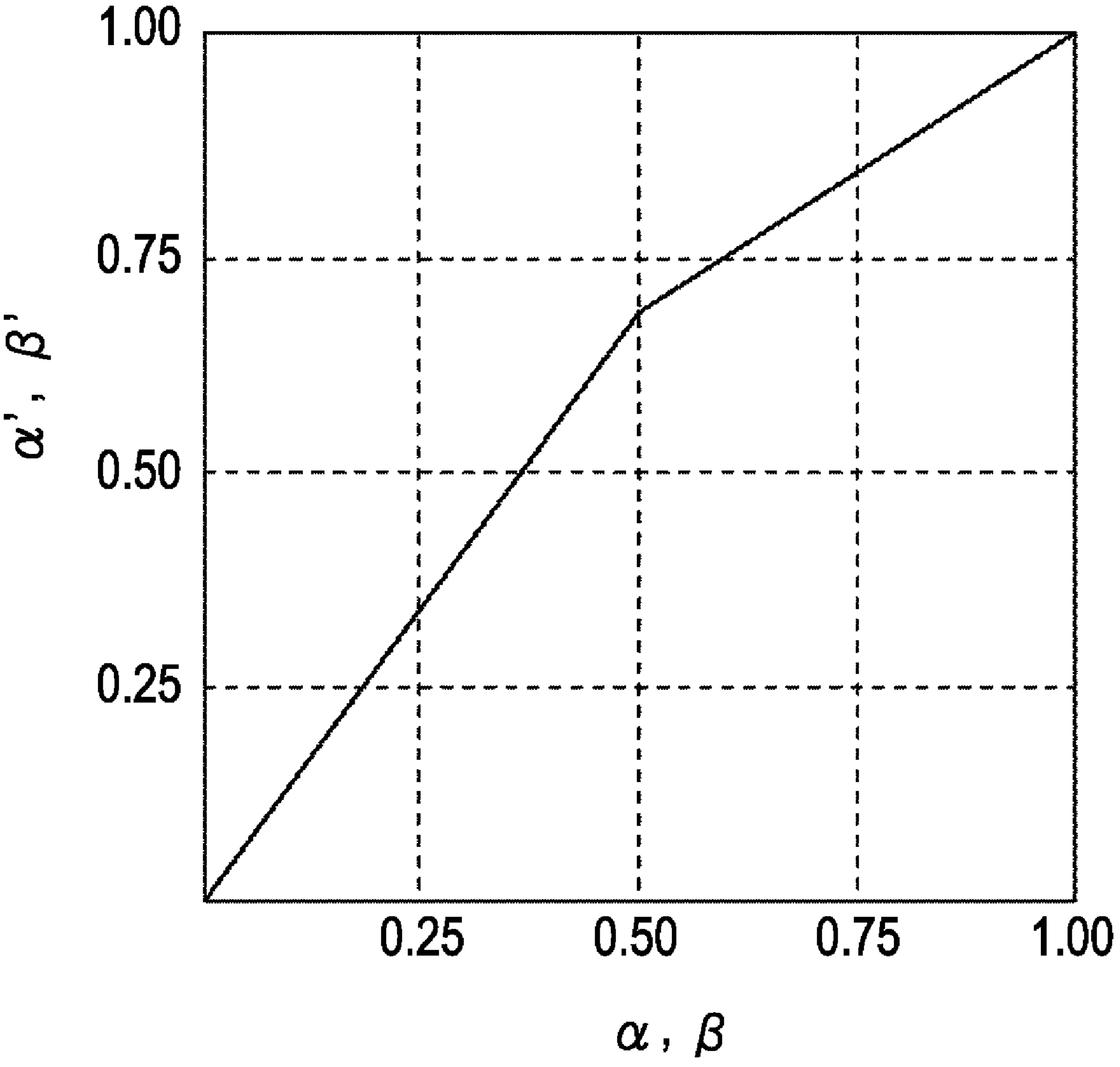
FIG. 9 is a graph illustrating gradation value conversion correction according to the first embodiment.

FIG. 9 illustrates a relationship between the image distribution coefficients α and β before the correction and the image distribution coefficients α' and β' after the correction when G=1.35.

FIG. 8E shows the gradation-value conversion parameters after the correction using the gradation-value conversion correction coefficient G.

For example, when α and β are 0.25, then α' and β' are 0.338.

FIG. 8F is a bitmap image after a second converter has converted the gradation values of the front and back pixels in the subscanning direction in accordance with image-correction parameters shown in FIG. 8E. FIG. 8G illustrates an exposure image at the image-bearing member for the bitmap image resulting from correcting the gradation values. The inclination of a main scanning line is cancelled, so that a horizontal straight line is formed. By correcting the gradation-value conversion parameters, it is possible to prevent density variation in a fine image occurring when misregistration is electrically corrected.

This embodiment has been described to illustrate a method of preventing density variation in a fine image, resulting from electrically correcting misregistration, by adjusting gradation-value conversion parameters, used for correcting the misregistration, according to a detection result of an optical sensor that detects the density of a detection toner image (including an intermediate gradation pixel) that is formed on the image bearing member.

Second Embodiment

This embodiment is related to a method of preventing density variation in a fine image, resulting from electrically correcting misregistration, by adjusting gradation-value conversion parameters, used for correcting the misregistration, according to a result of evaluation conducted by a user visually evaluating a test pattern of a test pattern image (including an intermediate gradation pixel) that is formed on a transfer material.

Figure 10:
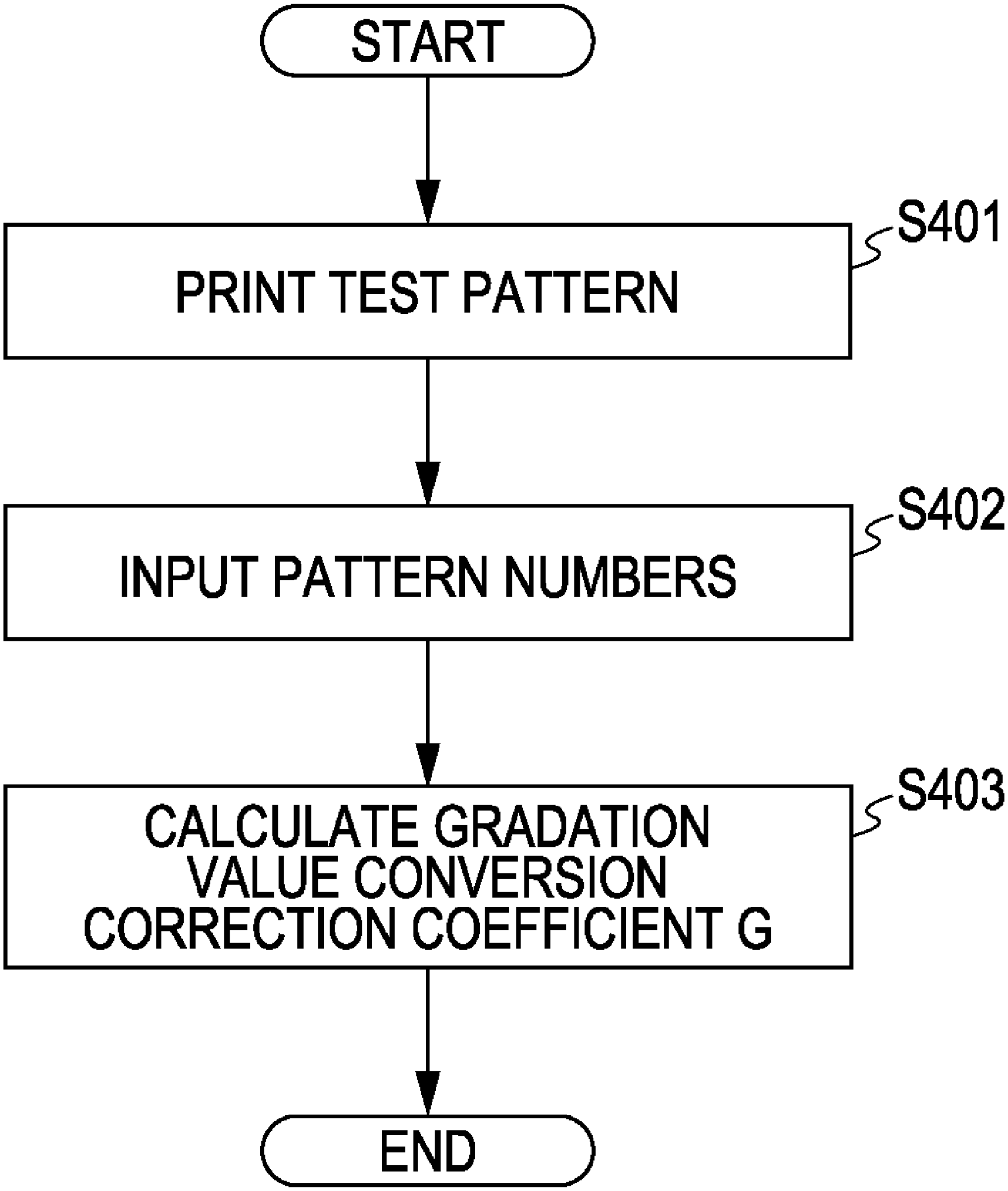
FIG. 10 is a flowchart of a procedure for calculating a gradation value conversion correction coefficient according to a second embodiment of the present invention.

An entire structure of an image-forming apparatus and a method of correcting misregistration according to the second embodiment are the same as those according to the first embodiment, and will not be described below. The second embodiment differs from the first embodiment only in a method of calculating a gradation-value conversion correction coefficient G. This method will hereunder be described with reference to the flowchart of FIG. 10.

Figure 11:
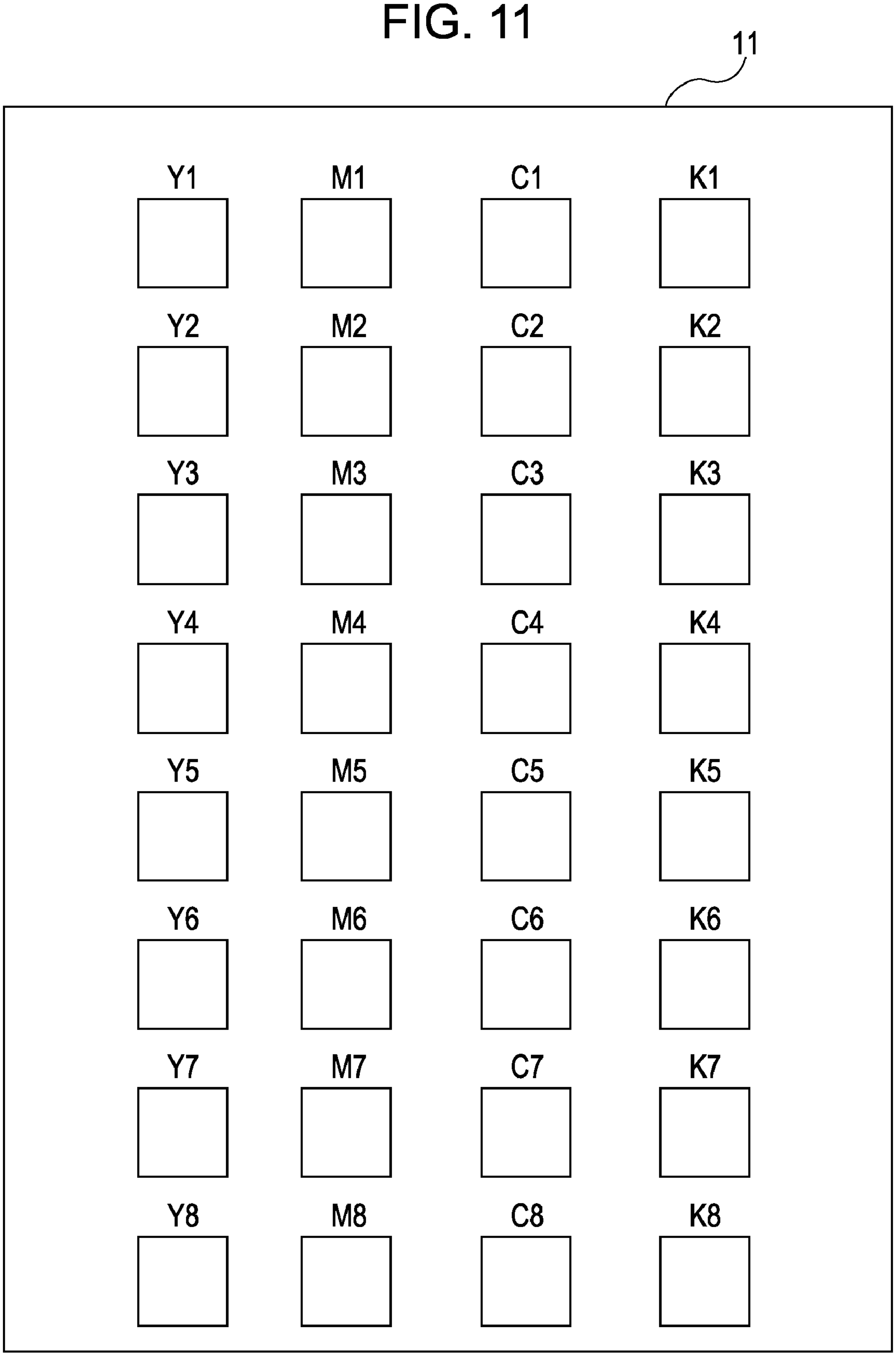
FIG. 11 illustrates a test pattern according to the second embodiment.

First, in Step S401, a test pattern is printed onto a transfer material (paper). FIG. 11 shows the test pattern formed on the transfer material. A total of 32 patches, each being a square patch having a side length of 30 mm, are formed at a 2-mm interval in accordance with Y, M, C, and K. Eight types of Y, M, C, and K are provided. Patterns of the respective patches are the same as those illustrated in FIGS. 6A and 6B showing the first embodiment. Y1, M1, C1, and K1 are each a repeating pattern of one-dot horizontal lines (formed at intervals of 2 dots), and dot image data of the lines is 100%. Y2 to Y7, M2 to M7, C2 to C7, and K2 to K7 are each a pattern in which one line is formed by two intermediate gradation dots.

The user chooses patterns whose densities are closest to those of the patch patterns Y1, M1, C1, and K1 from Y2 to Y7, M2 to M7, C2 to C7, and K2 to K7, and uses an operation panel (not shown) at the apparatus body to input the numbers of the selected patterns (one color each being selected from Y2 to Y7, M2 to M7, C2 to C7, and K2 to K7) in Step S402.

Next, in Step S403, a controlling CPU (not shown) at the apparatus body calculates gradation-value conversion correction coefficients G corresponding to the input pattern numbers.

The above-described steps are for calculating the gradation-value conversion correction coefficients G for correcting misregistration.

The misregistration is corrected using the calculated gradation-value conversion correction coefficients G. The method of correcting the misregistration is the same as that according to the first embodiment.

This embodiment has been described to illustrate a method of preventing density variation in a fine image, resulting from electrically correcting misregistration, by adjusting gradation-value conversion parameters, used for correcting the misregistration, according to a result of evaluation conducted by a user visually evaluating a test pattern of a test pattern image (including an intermediate gradation pixel) that is formed on a transfer material.

Third Embodiment

This embodiment is related to a method of preventing density variation in a fine image, resulting from electrically correcting misregistration, by adjusting gradation-value conversion parameters, used for correcting the misregistration, on the basis of density information read by an original reader reading the image density that is image information of a test pattern of a test pattern image (including a pixel of intermediate gradation) that is formed on a transfer material.

An entire structure of an image-forming apparatus and a method of correcting misregistration according to the third embodiment are the same as those according to the first embodiment, and will not be described below. The third embodiment differs from the first and second embodiments only in the method of calculating a gradation-value conversion correction coefficient G. An original reader and a PC are used for calculating the gradation-value conversion correction coefficient G.

Figure 12:
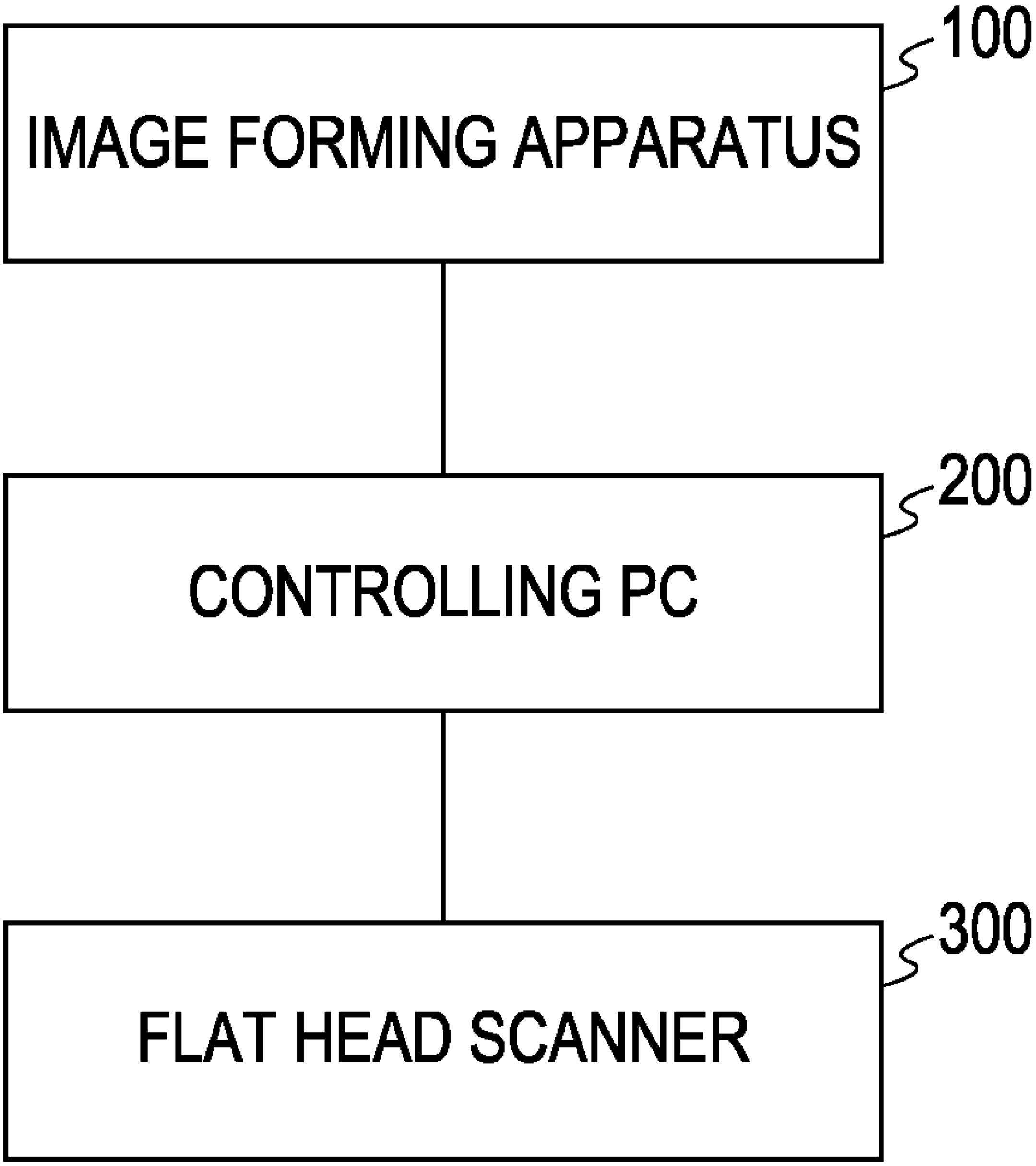
FIG. 12 is a block diagram illustrating a system configuration according to a third embodiment of the present invention.

FIG. 12 illustrates a system configuration according to the third embodiment. A controlling PC 200 is connected to an image-forming apparatus body 100. A flathead scanner (original reader) 300 is connected to the controlling PC 200.

Figure 13:
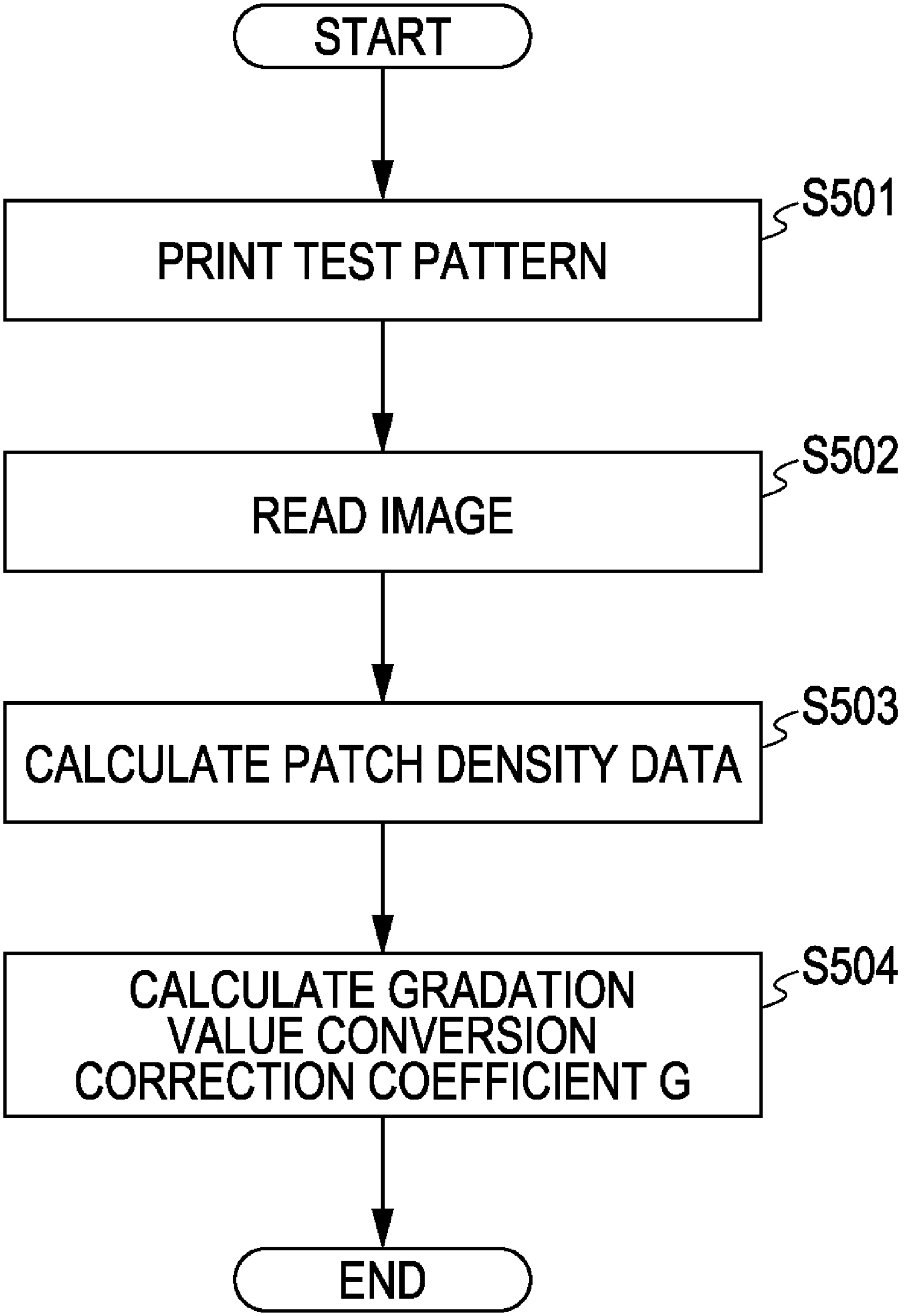
FIG. 13 is a flowchart of a procedure for calculating a gradation value conversion correction coefficient according to the third embodiment.
Figure 14:
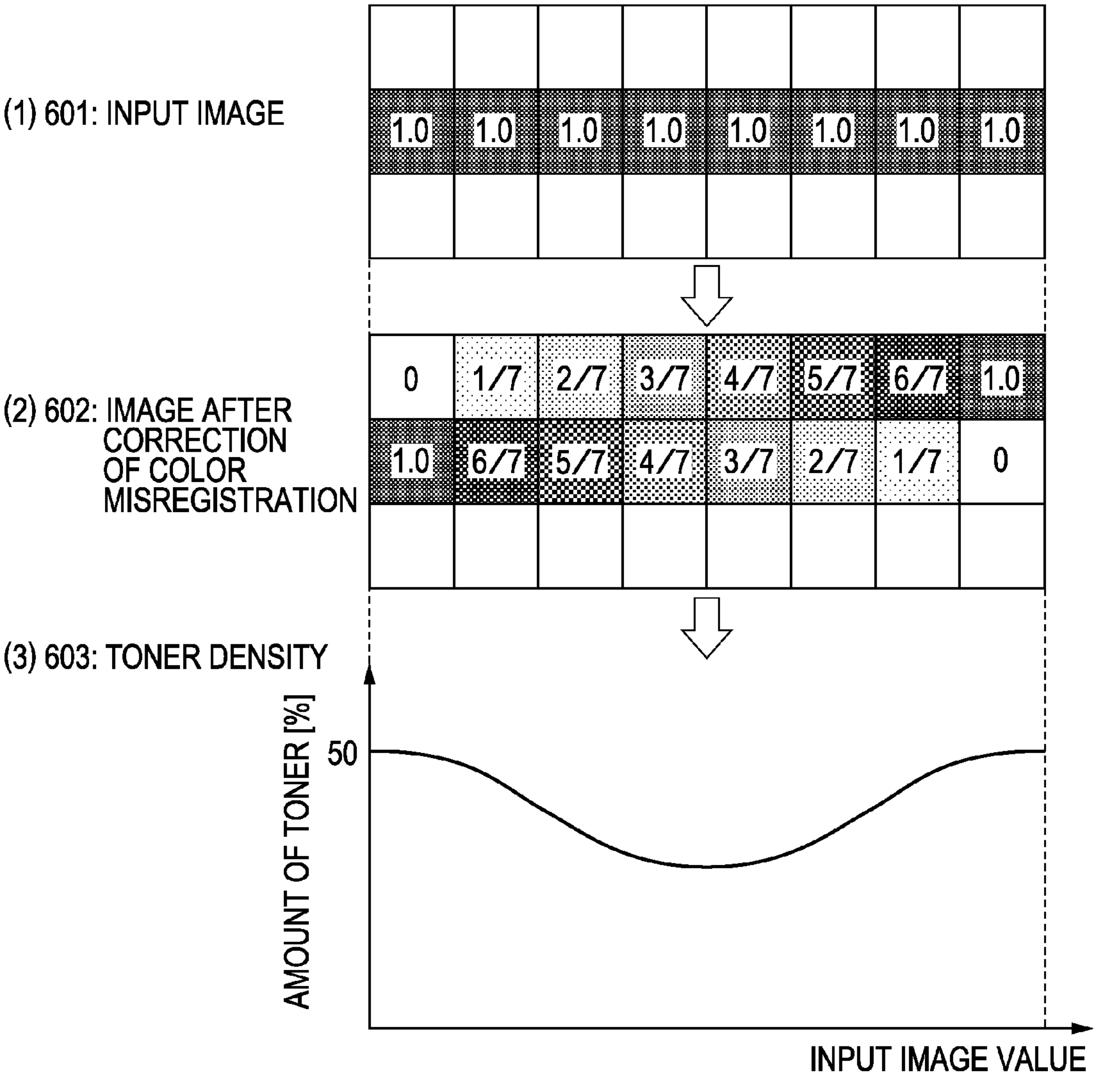
FIG. 14 illustrates density variation of a fine image.

The method of calculating the gradation-value conversion correction coefficient G will be described with reference to the flowchart shown in FIG. 13.

First, in Step S501, a test pattern is printed onto a transfer material (paper). A test pattern image is the same as that shown in FIG. 11 illustrating the second embodiment.

Next, in Step S502, the flathead scanner 300 reads image information (RGB image data) of a test chart. The image information is sent to the controlling PC 200.

The controlling PC 200 determines a patch position of the test chart from the image information sent from the flathead scanner 300, and calculates an average output value (RGB data) for each patch. The average output values are converted into density data for the respective patches (Step S503).

Next, in Step S504, the gradation-value conversion correction coefficient G is calculated. The method of calculation is the same as that according to the first embodiment.

The above-described steps are for calculating the gradation-value conversion correction coefficient G for correcting misregistration.

The calculated gradation-value conversion correction coefficient G is used when correcting misregistration. The method of correcting misregistration is the same as that according to the first embodiment.

This embodiment has been described to illustrate a method of preventing density variation in a fine image, resulting from electrically correcting misregistration, by adjusting gradation-value conversion parameters, used for correcting the misregistration, on the basis of density information read by an original reader reading the image density that is image information of a test pattern of a test pattern image (including a pixel of intermediate gradation) that is formed on a transfer material.

Although, in the embodiment, an externally connected flathead scanner is used as the original reader, when the image-forming apparatus has, like a copying machine, an original reader, the original reader may be used.

In the first to third embodiments, a gradation-value conversion correction coefficient G is calculated. It is desirable to perform the calculation at an optimal timing in accordance with image-density variation. For example, it is suitable to calculate the gradation-value conversion correction coefficient G, for example, for every certain number of prints, or when a consumable, such as a photosensitive member, is replaced, or when an operating environment (such as temperature or humidity) changes considerably.

Although, in the first to third embodiments, the correcting of misregistration is taken as an example, the present invention may be applied to other image-position corrections. For example, the some embodiments may be applicable to correcting image bending or magnification. In other words, any method that electrically corrects the position of an image is included within the scope of the present invention.

While the present invention has been described with reference to exemplary embodiments, it is to be understood that the invention is not limited to these exemplary embodiments. Obviously, various modifications and applications may be made within the scope of the claims.

This application claims the benefit of Japanese Application No. 2006-106326 filed Apr. 7, 2006, which is hereby incorporated by reference herein in its entirety.

What is claimed:

1. An image-forming apparatus configured to adjust a slope of an image in image information, the image-forming apparatus comprising:

- a first converter that corrects at least one image slope in one pixel units by converting a coordinate of the image;
- a second converter that corrects at least one image slope in less-than-one pixel units in a boundary where the first converter converts the coordinate of the image in one pixel units in a sub-scanning direction by changing, at each main-scanning position, gradation values to be assigned to a plurality of pixels at a same main-scanning position in the sub-scanning direction;
- an image-forming device that forms at least one toner image onto an image bearing member on a basis of image information corrected by the first converter and the second converter;
- a controller configured to form a test toner image including an intermediate gradation pixel using the image-forming device;
- a detector that detects a light reflection characteristic of the test toner image that is formed by the image-forming device; and
- an adjuster that adjusts gradation values to be assigned to a plurality of pixels at a same main-scanning position in the sub-scanning direction in accordance with an output of the detector.

2. An image-forming apparatus according to claim 1, wherein the at least one image slope includes a plurality of image slopes, the at least one toner image includes a plurality of monochromatic toner images that are of different colors, the image-forming device includes a plurality of monochromatic toner-image forming units that form the plurality of monochromatic toner images, the image-forming device forms a multi-colored toner image by superimposing the plurality of monochromatic toner images formed by the plurality of monochromatic toner-image-forming units, and wherein the second converter corrects the plurality of image slopes on a basis of information regarding mis-registration between the plurality of monochromatic toner images.

3. An image-forming apparatus according to claim 2, wherein the first converter and the second converter are implemented in a single converter.

4. An image-forming apparatus according to claim 2, wherein the test toner image is a test pattern image including an intermediate gradation pixel, the image-forming apparatus further comprising:

an inputting device for inputting an evaluation result of the test pattern image.

5. An image-forming apparatus according to claim 2, wherein the detector is an original reader that reads a test pattern image formed by the image-forming device.

6. An image-forming apparatus according to claim 1, wherein the first converter and the second converter are implemented in a single converter.

7. An image-forming apparatus according to claim 1, wherein the test toner image is a test pattern image including an intermediate gradation pixel, the image-forming apparatus further comprising:

an inputting device for inputting an evaluation result of the test pattern image.

8. An image-forming apparatus according to claim 1, wherein the detector is an original reader that reads a test pattern image formed by the image-forming device.

* * * * *